US010354533B2

(12) United States Patent
Cole et al.

(10) Patent No.: US 10,354,533 B2
(45) Date of Patent: Jul. 16, 2019

(54) SYSTEM FOR AND METHOD OF COMMUNICATING INFORMATION BETWEEN A HOST APPLICATION AND EXTERNAL SMART OBJECTS CONTROLLED BY A WEB APPLICATION

(71) Applicant: Citifyd, Inc., Portland, OR (US)

(72) Inventors: Dave Cole, Portland, OR (US); Sohrab Vossoughi, Portland, OR (US); Igor Cornelio Lira, Recife (BR); Gabriel Lopes, Portland, OR (US)

(73) Assignee: Citifyd, Inc., Portland, OR (US)

( * ) Notice: Subject to any disclaimer, the term of this patent is extended or adjusted under 35 U.S.C. 154(b) by 0 days.

(21) Appl. No.: 15/956,666

(22) Filed: Apr. 18, 2018

(65) Prior Publication Data

US 2019/0130750 A1 May 2, 2019

Related U.S. Application Data

(63) Continuation-in-part of application No. PCT/US2017/057437, filed on Oct. 19, 2017.

(60) Provisional application No. 62/410,189, filed on Oct. 19, 2016.

(51) Int. Cl.
*G08G 1/14* (2006.01)
*G06F 16/957* (2019.01)
*G06F 16/958* (2019.01)

(52) U.S. Cl.
CPC .......... *G08G 1/144* (2013.01); *G06F 16/958* (2019.01); *G06F 16/9577* (2019.01); *G08G 1/145* (2013.01)

(58) Field of Classification Search
CPC ...... G08G 1/144; G08G 1/145; G06F 16/958; G06F 16/9577; G07B 15/00; H04W 88/02
USPC ...................................... 340/932.2
See application file for complete search history.

(56) References Cited

U.S. PATENT DOCUMENTS

| 8,793,239 | B2 * | 7/2014 | Dalvi ............... G06F 16/951 707/709 |
| 8,843,847 | B1 | 9/2014 | Boyle et al. |
| 2016/0117866 | A1 | 4/2016 | Stancato et al. |
| 2016/0140846 | A1 | 5/2016 | Outwater et al. |

* cited by examiner

*Primary Examiner* — John A Tweel, Jr.
(74) *Attorney, Agent, or Firm* — Stoel Rives LLP; Robert R. Teel

(57) ABSTRACT

Systems and methods communicate parking access information between a host application associated with an operator of a parking area and a web application associated with a parking fee management provider for facilitating access, by a user carrying a smartphone, to the parking area secured by an external smart object. The external smart object is controllable through operation of the web application and actuatable through wireless personal area network (WPAN) communications exchanged between the smartphone and the external smart object in response to the operation of the web application causing the host application to generate the WPAN communications.

14 Claims, 14 Drawing Sheets

FIG. 7

SYSTEM FOR AND METHOD OF COMMUNICATING INFORMATION BETWEEN A HOST APPLICATION AND EXTERNAL SMART OBJECTS CONTROLLED BY A WEB APPLICATION

RELATED APPLICATION

This application is a continuation-in-part of International PCT Application No. PCT/US2017/057437, filed Oct. 19, 2017, which claims priority benefit of U.S. Provisional Patent Application No. 62/410,189, filed Oct. 19, 2016, which is hereby incorporated by reference in its entirety.

COPYRIGHT NOTICE

© 2018 Citifyd, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure relates to collecting and exchanging data between external hardware and a host application and, in particular, to a system for and a method of communicating information between a host application and external smart objects as authorized and controlled by a web application.

BACKGROUND INFORMATION

Host applications offer to users access to other applications available on a computer network. For example, a sports team organization might maintain its host application that allows attendees at a sporting event to access concessions services through a separate specialized concessions application in the form of an external (e.g., third-party maintained) native application. One objective in such an arrangement is to provide user access to an external native application, but this presents a challenge of organizing the efforts of separate application developers in a way that maintains a consistent user experience associated with the host application. The following is an example of a conventional solution formulated to attempt to meet this objective in an implementation of a vehicle parking fee payment and collection management system.

FIG. 1 is a block diagram showing, as an example, a conventional solution 10 that entails use of a link 12 from a host application 14 to open a native application 16 of a vehicle parking fee payment and collection management service provider (hereafter, parking fee management provider). Native application 16 is developed to specifically match the look and feel of host application 14 while providing access to services that are not available in host application 14. Thus, host application 14 in the form of a website or other application is presented on a user's mobile or smart device 18, typically a smartphone, and provides the user with a unique identifier (UID) to access native application 16. The user has to first download native application 16 to smartphone 18 and thereafter open native application 16 each time it is used.

A parking fee management provider server 24 is linked by a network connection 26 and a smart object 28. (The parking fee management provider is sometimes referred to as "Citifyd" in the description and drawings.) Smart objects are physical devices, vehicles, buildings, and other items embedded with electronics, software, sensors, actuators, and network connectivity that enable the objects to collect and exchange data. Smart object 28 is a sensor in the form of a beacon that is linked by a short-range wireless connection 30 to native application 16 operating on smartphone 18. In this example, parking fee management provider server 24 and beacon 28 are components of the vehicle parking fee payment and collection management system.

SUMMARY OF THE DISCLOSURE

A method performed by a smartphone having a processor, memory device, and multiple wireless communication signal interfaces, communicates parking access information between a host application associated with an operator of a parking area and a web application associated with a parking fee management provider. The method facilitates access, by a user carrying the smartphone, to the parking area secured by an external smart object. The smart object is controllable through operation of the web application and actuatable through wireless personal area network (WPAN) communications exchanged between the smartphone and the external smart object in response to the operation of the web application. The method includes downloading to the memory device of the smartphone a hybrid mobile application, which includes native and web application machine-readable instructions. The native application machine-readable instructions, when executed by the processor, causes it to employ the multiple wireless communication signal interfaces of the smartphone and provide native functionality of the host application. The web application machine-readable instructions, when executed by the processor, causes it to present the web application in a webview browser and simulate the native functionality of the host application. The smartphone, in response to the processor executing the native application machine-readable instructions, obtains through the multiple wireless communication signal interfaces of the smartphone the parking access information including a location of the smartphone and presence information of the external smart object. The smartphone, in response to the processor executing the web application machine-readable instructions, provides by wireless communications between the smartphone and a server hosting the web application the parking access information to the web application. And the smartphone, in response to the provision of parking access information, generates the WPAN communications to actuate the external smart object based on controls made available through the operation of the web application.

A system communicates parking access information between a host application associated with an operator of a parking area and a web application associated with a parking fee management provider. An external smart object secures the parking area. The external smart object is controllable through operation of the web application and actuatable through wireless personal area network (WPAN) communications. A mobile device has a hybrid mobile application that includes the host application and the web application functionally interacting with each other by operation of a webview browser. The hybrid mobile application includes computer code operating in the webview browser to provide a native bridge for exchanging the WPAN communications with the external smart object and obtaining parking access information from the mobile device. A server hosts the web application and facilitates access, by a user carrying the mobile device, to the parking area based on the parking access information provided through the web application.

An advantage of this architecture is that program maintenance entailing software feature changes and updates may be made to the web application exclusively, thereby necessitating no modification to the host application.

Additional aspects and advantages will be apparent from the following detailed description of embodiments, which proceeds with reference to the accompanying drawings.

BRIEF DESCRIPTION OF THE DRAWINGS

FIGS. 7 and 8 are screen captures of a webpage UI allowing a user to complete a purchase for reserving access to a parking area.

FIGS. 13A and 13B are collectively referred to as FIG. 13.

DETAILED DESCRIPTION OF EMBODIMENTS

Figure 1:
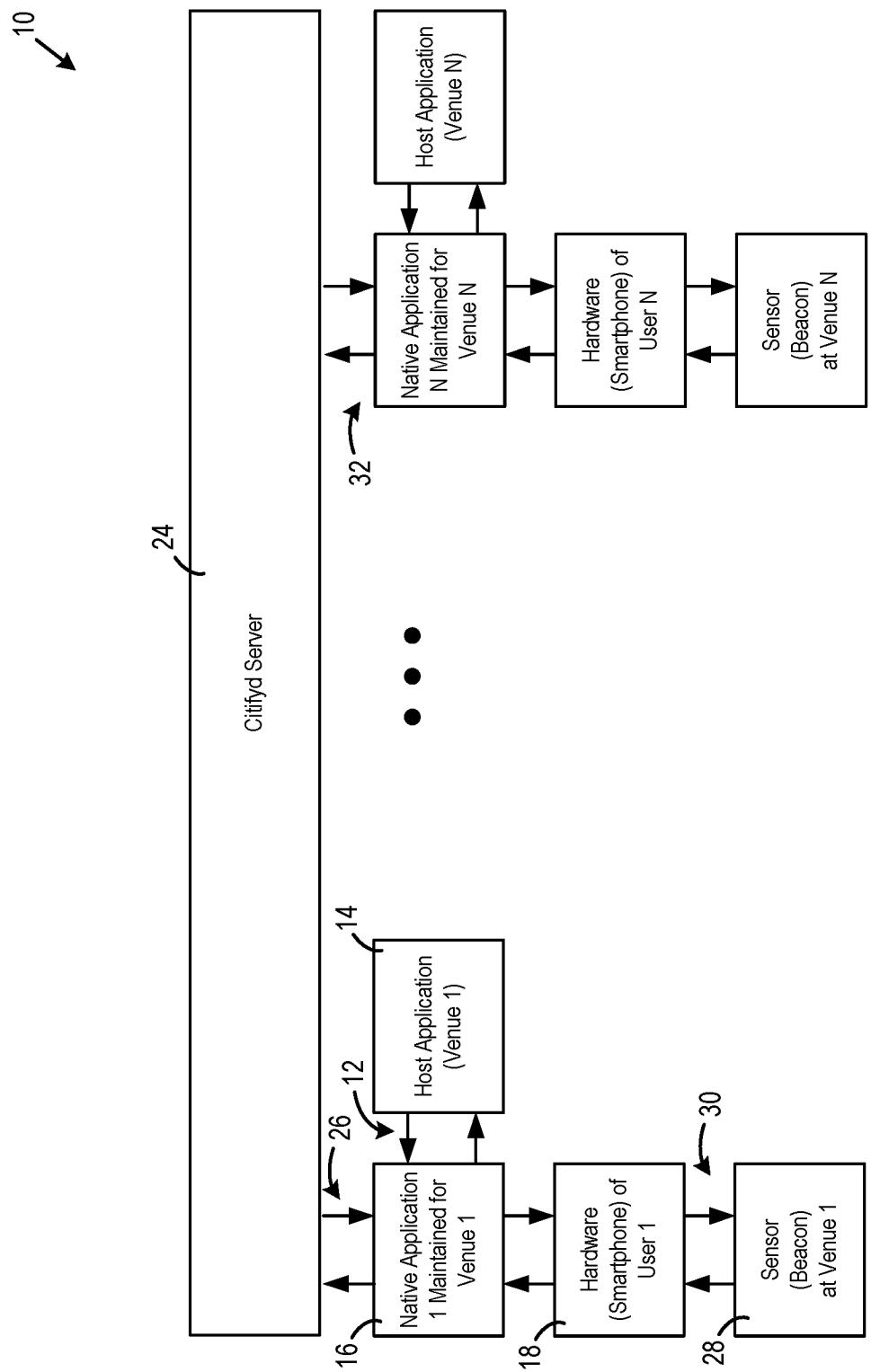
FIG. 1 is a block diagram showing, as an example, a conventional solution that entails use of a link from a host application to open a native application of a vehicle parking fee payment and collection management service provider.

With reference to FIG. 1, a disadvantage of conventional solution 10 is that the operators of host applications do not want users to download unaffiliated (e.g., third-party non-whitelisted) native applications onto the users' smartphones because such applications sometimes lack the look and feel of the host application. Likewise, developers of non-whitelisted native applications expend significant resources in developing and maintaining discrete codebases for each different host or venue, as indicated by another set 32 of host and native applications at the right side of FIG. 1. And although web applications would allow developers an ability to streamline their codebase, such applications executing in a dedicated browser, e.g., on a website loaded by a smartphone, have no (or limited) ability to access hardware of the smartphone, which prevents the smartphone from detecting a beacon or wirelessly instructing it to open a gate securing a parking area.

Figure 2:
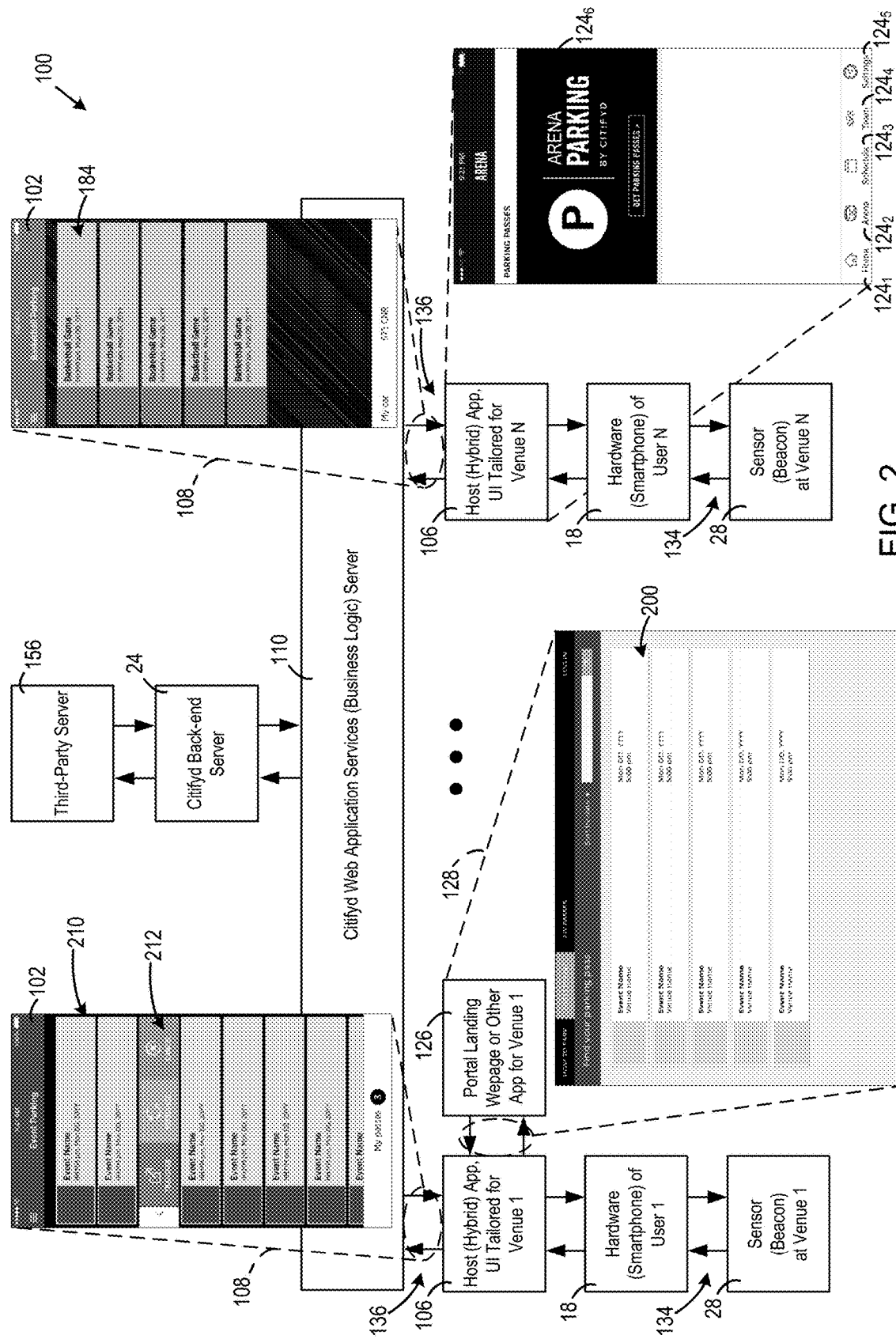
FIG. 2 is a block diagram showing an overview of the user interfaces (UIs) and functional relationships of the components of an embodiment of a vehicle parking fee payment and collection management system using a parking web application to communicate information between an external smart object and a host application operating on a mobile device.

This disclosure, therefore, describes techniques to hybridize a downloadable host application to include within it a common set of non-native machine readable instructions (e.g., web application functionality) thereby allowing the host and web applications to seamlessly control parking service utilities that facilitate access to a secured parking area, all while simulating the native features and appearance of the host application. For example, the left and right sides of FIG. 2 show functionally identical web applications that are each tailored in appearance. Because the left and right sides of FIG. 2 indicate functionally similar hypothetical deployment scenarios for, respectively, the Denver Nuggets and the Portland Trail Blazers professional basketball teams, the right side is described first, followed by a brief description of differences shown on the left side. Common to both sides, however, are identical reference numbers used for indicating similar components, which are also shown throughout the other drawing figures of this disclosure.

Figure 5:
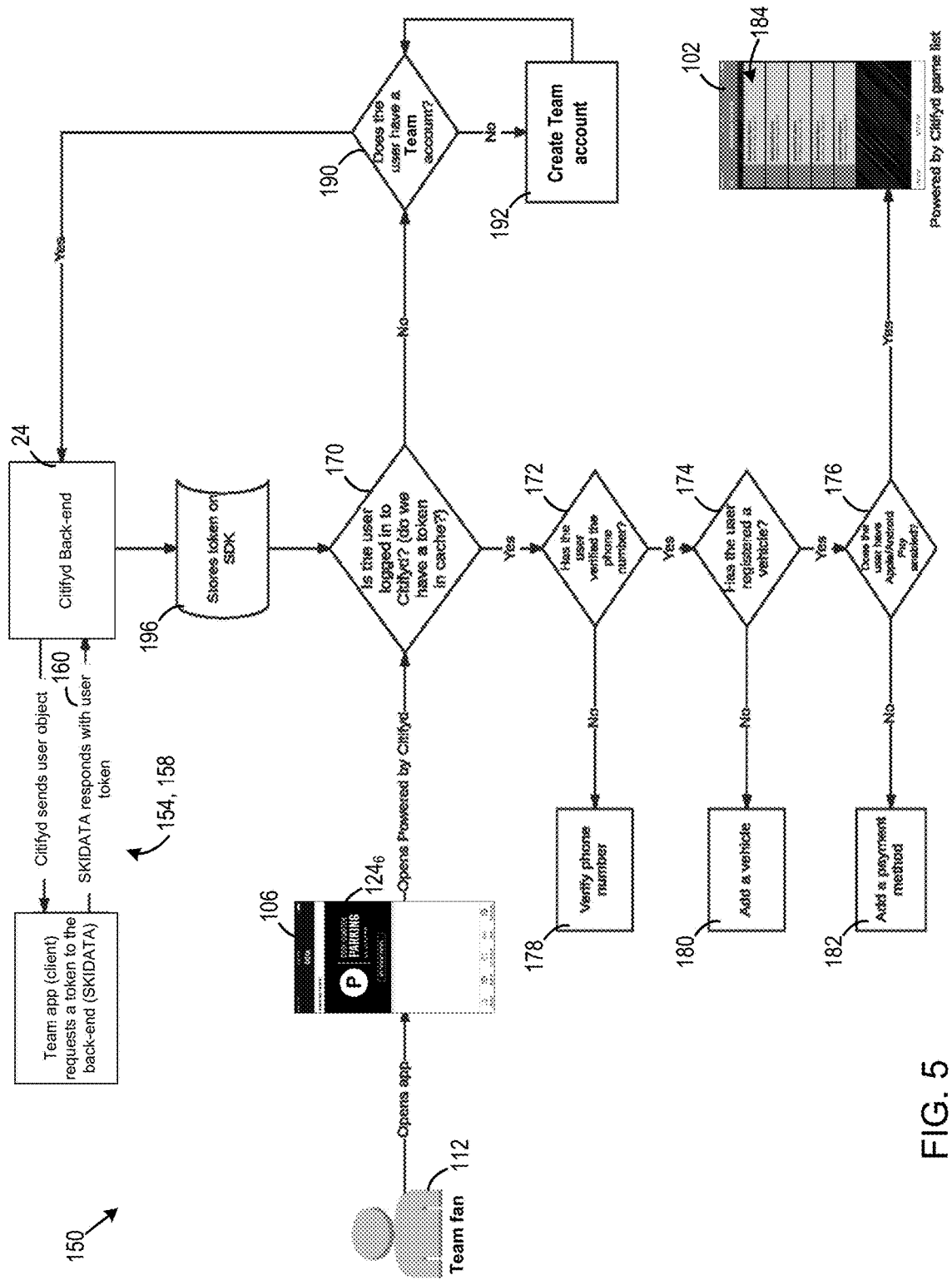
FIG. 5 is a flow diagram showing an authentication process performed in the system of FIGS. 2-4.

Specifically, FIG. 2 shows a vehicle parking fee payment and collection management system 100 that implements a mobile-based vehicle parking management solution. The solution uses a parking web application 102 to communicate information between external smart object 28, which in some embodiments implement the iBeacon protocol, and a hybrid mobile application 106 operating on mobile device 18, which is typically smartphone 18 carried by a user 112 (FIG. 5).

Hybrid mobile application 106 includes a host application and a web application. In common parlance and the examples that follow, however, the terms hybrid (mobile) application and host application are used interchangeably because host application 106 is supplemented to include within it hybrid capabilities that in effect make it a hybrid application. The result is a hybrid application because, like a native application, it is packaged as a mobile application for download distribution through app stores and has access to native device application program interfaces (APIs). And unlike a pure native application, host application 106 also includes, for example, non-native layout rendering achieved via webviews instead of the platform's native UI framework. But with native functionality, host application 106 is also not a purely web-based application, as in the case of pure web applications accessible through a dedicated Internet browser. In this sense, host application 106 provides a wrapper for running web applications that access native functions through the native API capabilities.

Parking web application 102 is accessed through a webview browser (or simply, webview) 108 of hybridized host application 106 and hosted on a web server 110, which can be a standalone server or parking fee management provider server 24. In other words, webview 108 enables host application 106 and web application 102 to functionally interact with each other once web server 110 delivers the web content so as to control the vehicle parking fee payment and collection management functions accessed through hybridized host application 106 operating on smartphone 18. For example, software comprising web application 102 initiates communications between it and beacon 28. Beacon 28, together with smartphone 18, senses the presence of vehicles, as described later with reference to FIGS. 12 and 13.

Host application 106, which user 112 has downloaded to and launches from smartphone 18, represents an application of an organization such as a professional sports team that operates vehicle parking surface lot and garage facilities at the team sports venue. For example, host application 106 presents on the display screen of smartphone 18 user-operable actuators $124_1$, $124_2$, $124_3$, $124_4$, $124_5$, and $124_6$ in the form of icon images from which user 112 can select to access different computer programs. User selection of actuator $124_6$ accesses parking web application 102. Thus, in the example shown on the right side of FIG. 2, web application functionality is accessible directly from host application 106, which is a hybridized version of a VenueNext Sports & Entertainment iOS application available from VenueNext of San Francisco, Calif.

In other embodiments, such as the one shown on the left side of FIG. 2, a separate dedicated website 126 (i.e., accessible through a browser 128, which may also be shown in a webview) facilitates processes of authenticating (i.e., Citifyd account login), purchasing a parking reservation, and generating a so-called magic (or deep) link that user 112 receives and taps to automatically authenticate themselves with and obtain access to parking web application 102 that then facilitates locating and accessing the secured and reserved parking area. Deep link integration is explained later with reference to FIGS. 8-11.

Figure 3:
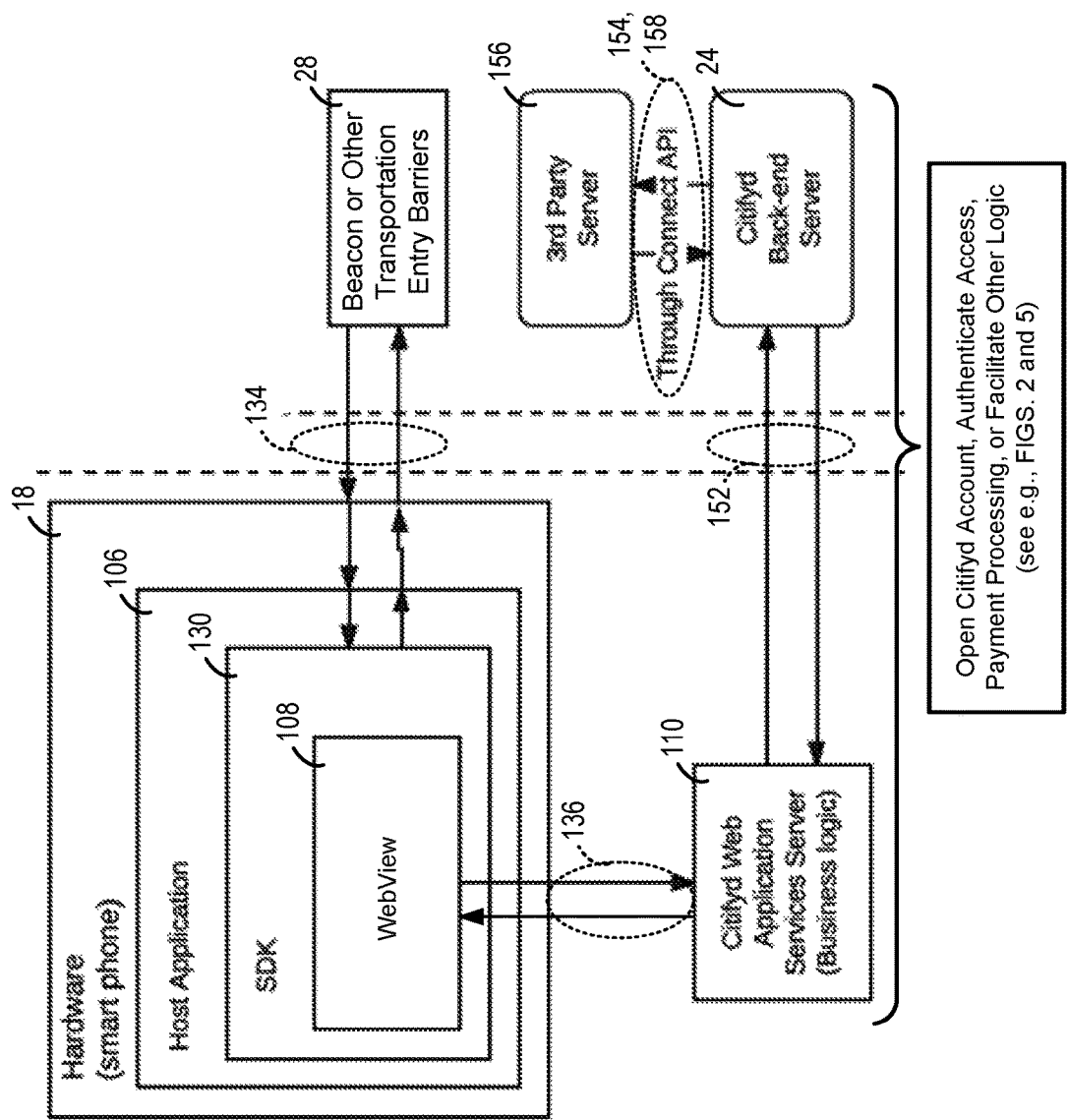
FIG. 3 is a simplified block diagram showing on left and right sides, respectively, user-facing and user-transparent (e.g., back-end) arrangements of the components of the system of FIG. 2.
Figure 4:
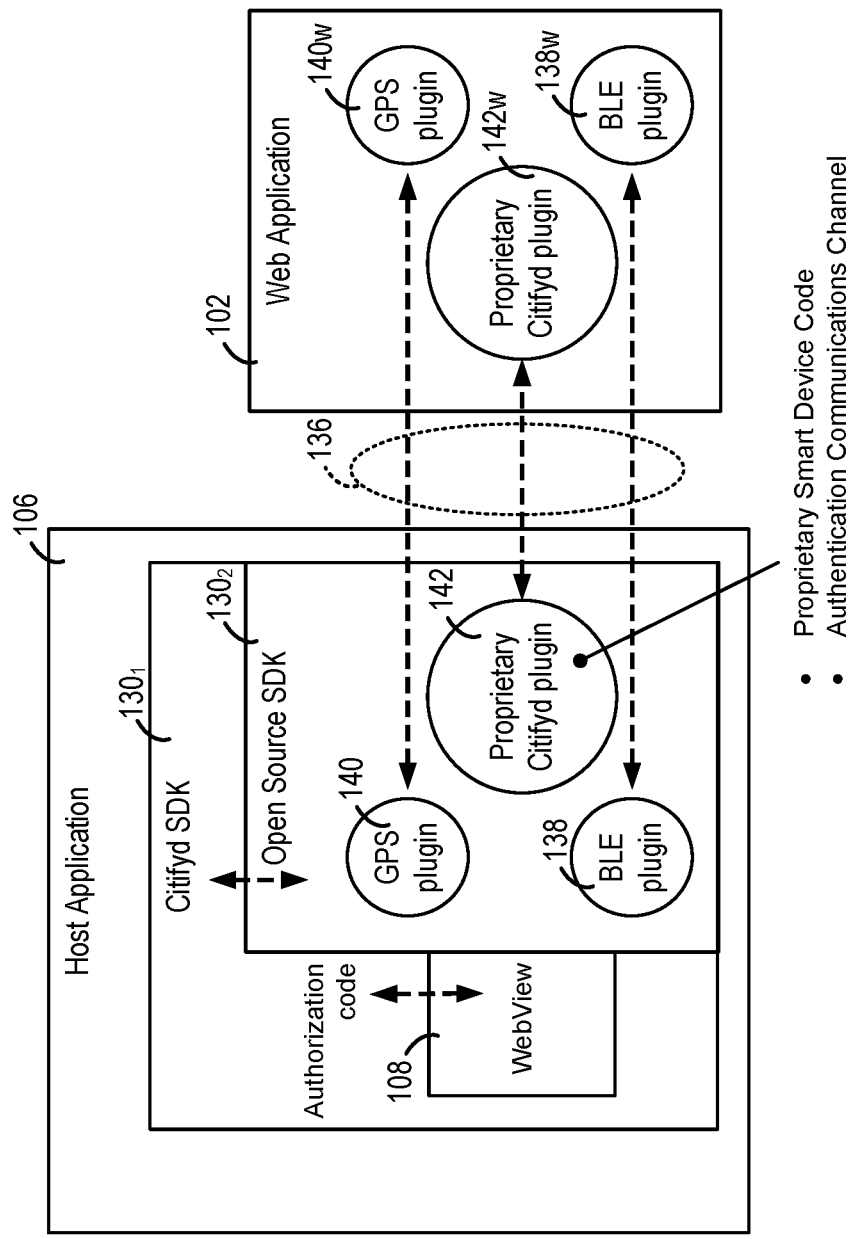
FIG. 4 is a diagram showing the architecture of an implementation of a hybrid mobile application combining functionality of the host application and the web application for interacting with the external smart object of the system of FIGS. 2 and 3.

FIGS. 3 and 4 show in greater detail the architecture of an implementation of host application 106 and its interaction with web application 102 and beacon 28. For instance, FIG. 3 shows that host application 106 includes a software development kit (SDK) framework 130. And FIG. 4 shows that, in some embodiments, SDK framework 130 includes a parking fee management provider ("Citifyd") SDK framework $130_1$ and an Apache Cordova open-source mobile SDK framework $130_2$.

Citifyd SDK framework $130_1$ is the web application layer for calling native functionality realized by open-source SDK framework $130_2$. For example, Citifyd SDK framework $130_1$ facilitates an authentication process (e.g., passing an authentication code of a deep link) and device-side web application processing, e.g., executing standardized web technologies—i.e., Hypertext Markup Language (HTML) version 5, Cascading Style Sheets (CSS) version 3, and JavaScript code—inside webview 108 as shown in a "WEB APP" column of FIGS. 6, 10, 12, and 13. Open-source mobile SDK framework $130_2$ provides a native bridge to access hardware capabilities of smartphone 18 through APIs, which are built with native code. Furthermore, open-source SDK framework $130_2$ is tightly integrated with and controlled through specially developed functionality of Citifyd SDK framework $130_1$, as follows.

The specially developed functions include encryption, privacy keys, Bluetooth® Low-Energy (BLE) communication through a wireless communication link 134 (FIGS. 2 and 3), and user account authentication to coordinate vehicle parking management between host application 106 and parking web application 102 through a wireless Internet protocol communication link 136 (e.g., a socket) between webview 108 and parking web application 102 operating on web server 110. For example, a long-range wireless radio generates wireless local area network (WLAN) or wireless wide area network (WWAN) communications—e.g., Wi-Fi® or LTE—for reporting a proprietary code of beacon 28 and providing an authentication communications channel to server 24. Webview 108 receives through wireless Internet protocol communication link 136 information for implementing the functions of parking web application 102, including the processing of signals produced during operation of beacon 28. Also, Citifyd SDK framework $130_1$ contains software to implement handshake connection verification with beacon 28 and a single sign-on authentication experience for user 112 (see, e.g., FIG. 5). Moreover, as explained with reference to example processes shown in FIGS. 6, 10, 12, and 13, communication links 134 and 136 enable the exchange of parking access information obtained with communication interfaces 138, 140, and 142 of open-source SDK framework $130_2$ called upon by corresponding plugins 138w, 140w, and 142w of parking web application 102.

Open-source SDK framework $130_2$ provides first wireless communication interface 138 by control of a short-range wireless radio suitable for generating wireless personal area network (WPAN) communications—e.g., BLE wireless communication technology—for establishing wireless communication link 134 (FIGS. 2 and 3) between smartphone 18 and beacon 28. For example, web application 102 includes a BLE plugin 138w (i.e., a BLE API) that calls upon radio functions of smartphone 18 such that open-source SDK framework $130_2$ provides a hardware data gateway to beacon 28.

Likewise, open-source SDK framework $130_2$ provides second wireless communication signal interface 140 with a navigation system (not shown), such as the global positioning system (GPS) space-based satellite network, to provide to parking fee management provider server 24 (via web application 102 of server 110) information about the location and movement of user 112 carrying smartphone 18. In this case, web application 102 includes a GPS plugin 140w (i.e., a GPS API) that calls upon GPS functions of smartphone 18 such that open-source SDK framework $130_2$ provides a hardware data gateway to GPS services.

Open-source SDK framework $130_2$ also includes proprietary provider interface 142 for reporting a proprietary code of beacon 28 and providing an authentication communications channel. A counterpart proprietary provider plugin 142w is included in web application 102.

By enabling operation of parking web application 102 on web server 110 and not on a dedicated native application for smartphone 18, the architecture implemented with host application 106 necessitates, except for basic configuration data such as an identifier for host application 106 sent by it to SDK framework $130_1$, no permanently (i.e., statically) installed user-facing web application 102 software in host application 106 since this software can be dynamically obtained from server 110. This flexible architecture effects a streamlined software version control because parking web application 102 is the only application needing management service when feature changes or updates are to be made.

As indicated in FIGS. 2, 3 and 5, certain business logic operations are seamlessly facilitated by servers 24 and 110. Skilled persons will appreciate, however, that the types of tasks and operations divided between servers 24 and 110 may vary based on the nature of the tasks. For example, web server 110 may be used to authenticate a user account stored on back-end server 24, open a new user account, and authenticate entry through various transportation entry barriers, such as those of a taxi, bus, train, subway car, of boat, and other barriers to transport spaces that are (among other things) a subject of International PCT Application No. PCT/US2016/064829, titled "Vehicle Parking and Mass Transport Beacon System," which is hereby incorporated by reference in its entirety. Also, as described later, such transportation entry barriers are equipped with wireless communications hardware for wirelessly sending and receiving communications though through BLE or other communication standards such as Wi-Fi that wirelessly connect smartphone 18 with the smart object or beacon 28. Such external smart objects or beacons are, therefore, controllable by web application 102 that, from a user perspective using smartphone 18, actuates mechanical actuators to open and close doors, gates, turnstiles, and other barriers (described in the aforementioned '829 application) so equipped with wireless communications hardware. In these situations, a host application may be associated with an operator of a transportation entry barrier (e.g., a gate to a parking area or a door to a rental car) whereas a web application may be associated with an access (e.g., parking or ride access) fee management provider.

The following FIGS. 5-13 show in greater detail example processes of launching web application 102 and authenticating with server 24, including by way of a deep link; purchasing parking reservations; and using a purchased reservation to obtain access to a secured parking area.

FIG. 5 shows user 112, having selected actuator 124₆ on the display screen of smartphone 18, opens a login session, which initiates an authentication process 150 to confirm whether user 112 has a valid vehicle parking service account stored on parking fee management provider server 24 before getting access to parking web application 102. Upon user launch of host application 106 and selection of actuator 124₆, a login session request is transmitted through an Internet protocol communication link 136 (FIGS. 3 and 4), optional link 152 (it is present when server 24 is separate from server 110) (FIG. 3), and a Connect API 154 between server 24 and a third party server 156 (FIG. 2).

Third party server 156 is a host server that is responsive to host application 106 to perform vehicle access and entry management. SKIDATA Inc., Hillsborough, N.J., is one example of a third party provider of vehicle access control and revenue management solutions that operates third party server 156.

Because server 156 is controlled by an organization unaffiliated with the parking management service provider that is responsible for the operation of parking web application 102, server 24 undertakes to access authorization for user 112 through an Internet protocol communication link 158 to third party server 156. Identification and account information of user 112 and source identification information of server 24 are stored on server 156, which, upon confirmation of the information provided, returns an authentication token 160 that contains security credentials for the login session and identifying user 112 and contains other information associated with the user account. Authentication token 160 is delivered to a native user interface element (a combination of design elements, fingerprints, tokens, and buffering) of host application 106 through communication link 136 to complete the login session and enable user 112 to begin a vehicle parking transaction by interaction with webview 108.

At decision block 170, host application 106 determines whether user 112 has authentication token 160 stored in cache memory of smartphone 18. If authentication token 160 for user 112 is stored in cache memory, host application 106, at decision blocks 172, 174, and 176, determines whether user 112 has in consecutive order, respectively, verified a user telephone number, registered a vehicle, and enabled a smartphone platform (e.g., Apple® or Android®) contact or mobile wallet payment feature. If the answer is NO to any of the inquiries set out in decision blocks 172, 174, and 176, host application 106 prompts user 112 to, respectively: verify, at process block 178, a telephone number; register, at process block 180, an additional vehicle; and add, at process block 182, a payment method. After fulfillment of the payment method criterion of decision block 176, user 112 is directed to access parking web application 102, as illustrated by an event list image 184 presented by webview 108. Preparatory to presenting event list image 184, web application 102 has dynamically downloaded, based on user 112 account information, corresponding machine-readable instructions (CSS, JavaScript, and HTML) that simulates a UI of host application 106, as explained later.

If authentication token 160 for user 112 is not stored in cache memory, host application 106, at decision block 190, determines whether user 112 has established an account with the organization operating host application 106. If user 112 has no such account, host application 106, at process block 192, causes user 112 to create a host application account.

Upon either confirmation of the existence or creation of a host application account, host application 106 requests from server 24 (via server 110, if separate) authentication token 160 for access by user 112. Server 24 in turn requests over IP protocol communication link 158 authentication token 160 from server 156, which in response returns it. At process block 196, authentication token 160 is provided over Internet protocol communication link 136 to host application 106 for storage in cache memory. The login session process flow resumes at decision block 170, proceeding with the YES decision, as described above.

An alternative implementation of authentication process 150 can be carried out in system 100 in which third party server 156 is not used and parking web application 102 operates on parking fee management provider server 24, functioning as web server 110 and an authentication server. To get access authorization, user 112 launches host application 106 on smartphone 18, navigates to the screen on which the icon image of user-operable actuator 124₆ appears, and selects actuator 124₆ to open a login session. If no authentication token 160 is stored, host application 106 directs user 112 to log in on webview 108. Upon completion of user login, authentication token 160 received from parking fee management provider server 24 is provided to parking web application 102 and stored in cache memory of host application 106. Storage of authentication token 160 in cache memory effects a single sign-on experience for user 112, who can thereafter forgo a sign-up process for subsequent login sessions.

Figure 6:
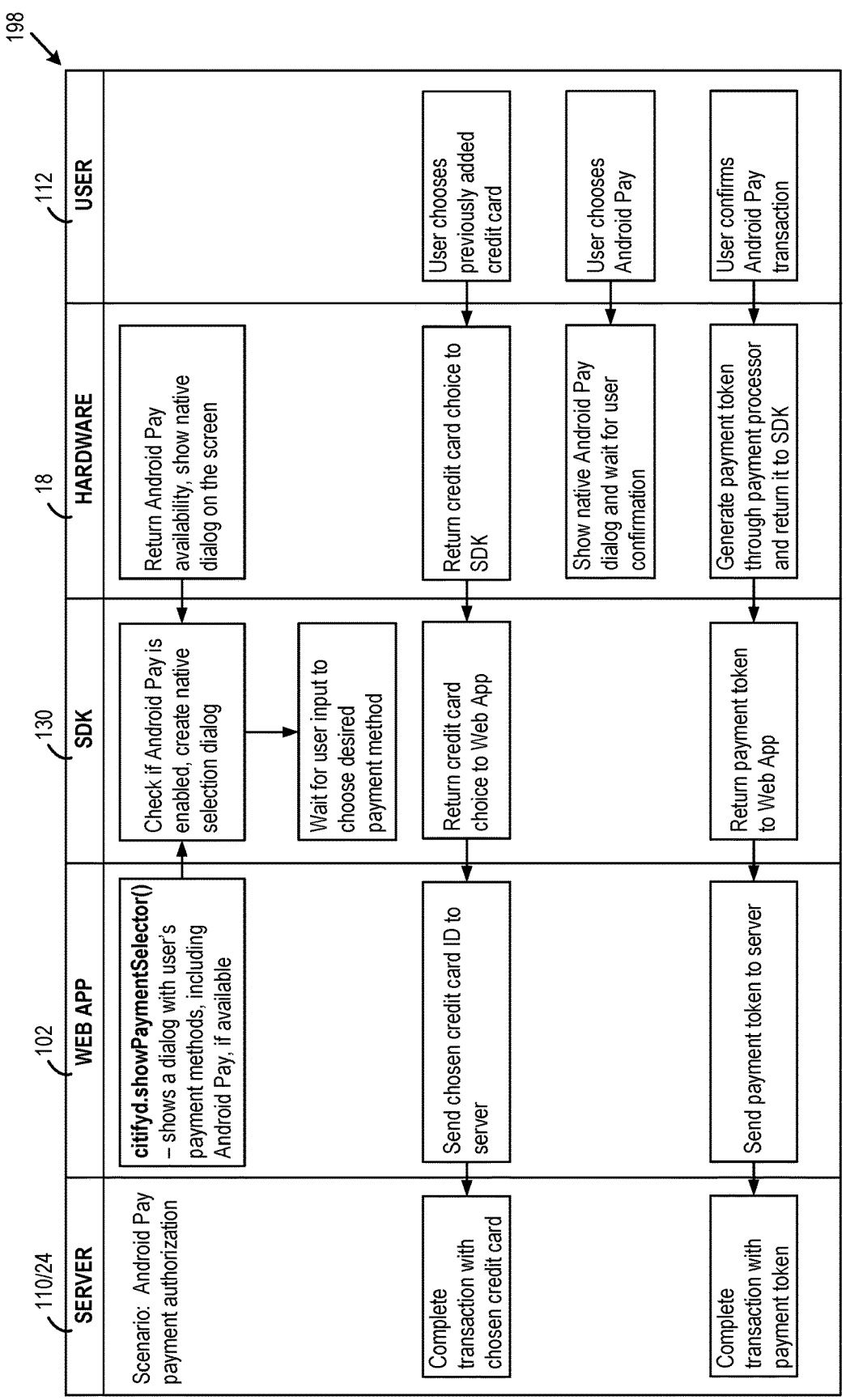
FIG. 6 is a flow diagram showing a process or payment using Android Pay.
Figure 7:
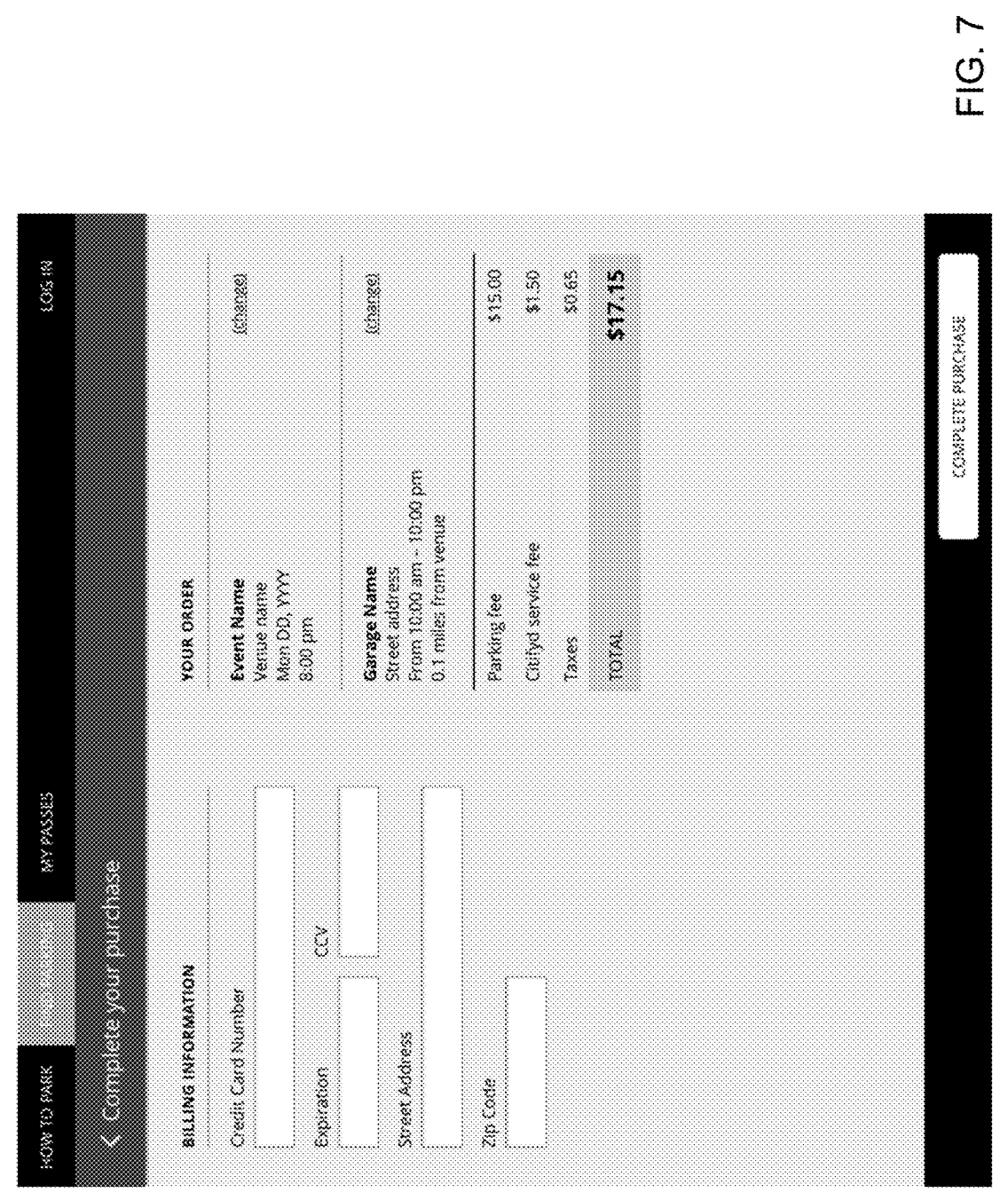

As indicated in FIGS. 2 and 5, there are two embodiments in which a user may reserve and purchase parking. According to a first embodiment, to make the purchase in host application 106, event list image 184 presented by webview 108 shows various events (e.g., scheduled basketball games) for which user 112 may tap and purchase parking through web application 102 using Apple Pay, Android Pay, or other preferred payment method. FIG. 6 shows in greater detail a process 198 for completing the transaction using Android Pay. According to a second embodiment, to make the purchase in a dedicated browser or other web-based tool, the left side of FIG. 2 shows a website event list 200, any item of which is selectable to proceed to corresponding credit card payment and confirmation webpages of, respectively, FIGS. 7 and 8.

Figure 9:
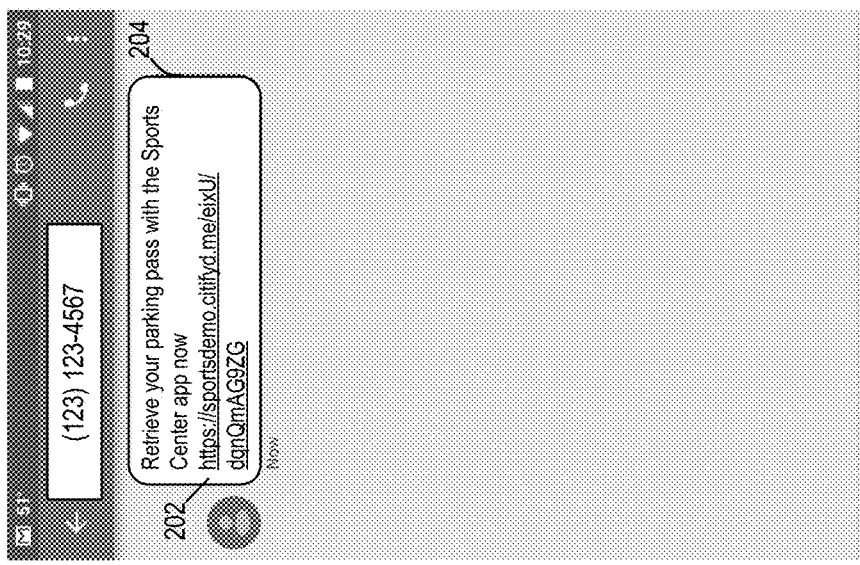
FIG. 9 is a screen capture showing a text message including a deep link for initiating a download of parking ticket information and tailored UI code made available through the parking web application that simulates in a webview browser native functionality of the host application.
Figure 8:
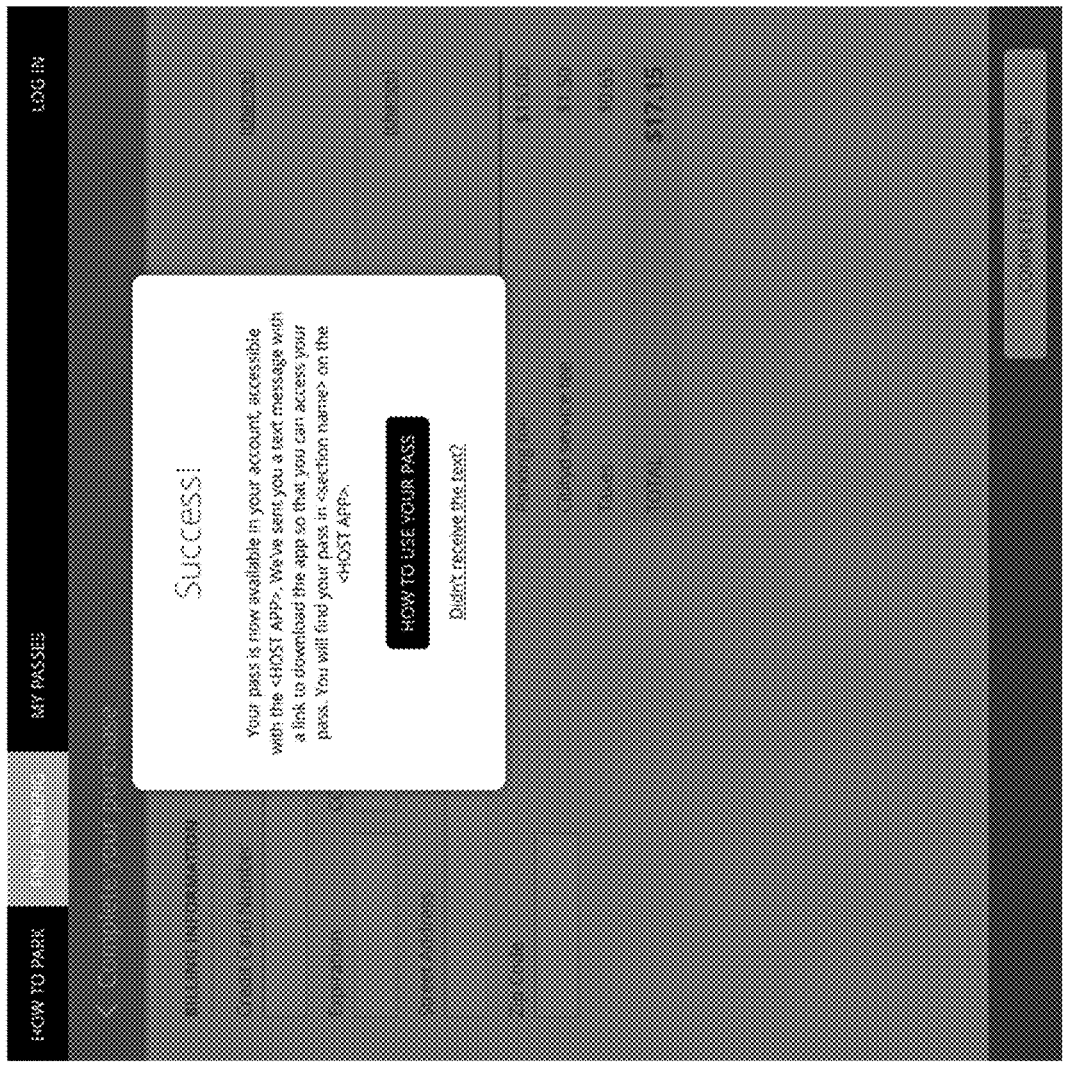

Notably, FIG. 8 provides instructions for using a deep link 202 (FIG. 9) that is generated upon payment and optionally delivered to user 112, e.g., in a text message 204 (FIG. 9). Because a webview will not natively receive deep links, SDK framework 130 is programmed to respond to a user-actuation of deep link 202 and forward its URL parameters to webview 108, according to a process 206 (FIG. 10) for handling a deep link.

Figure 10:
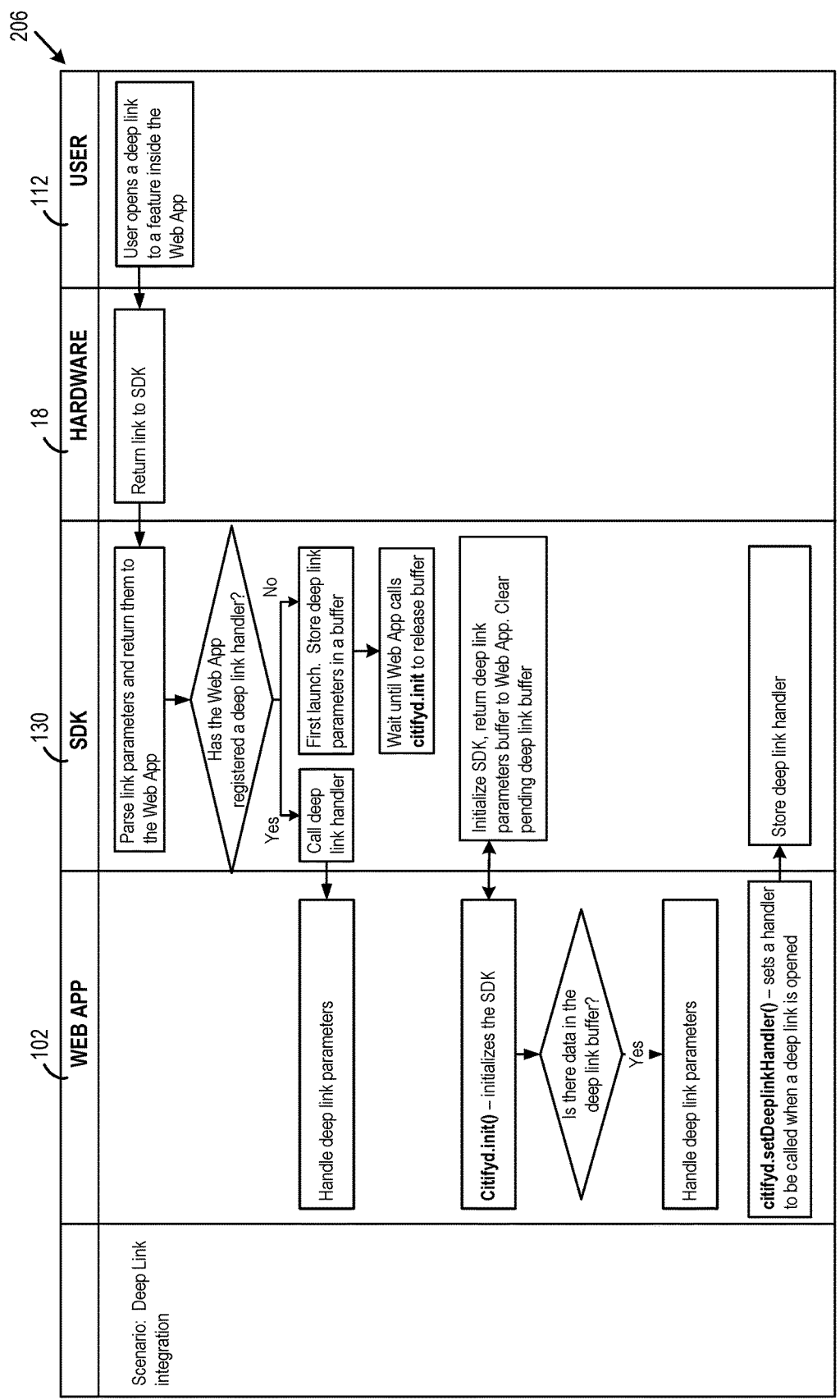
FIG. 10 is flow chart showing a process for handling the deep link of FIG. 9.
Figure 11:
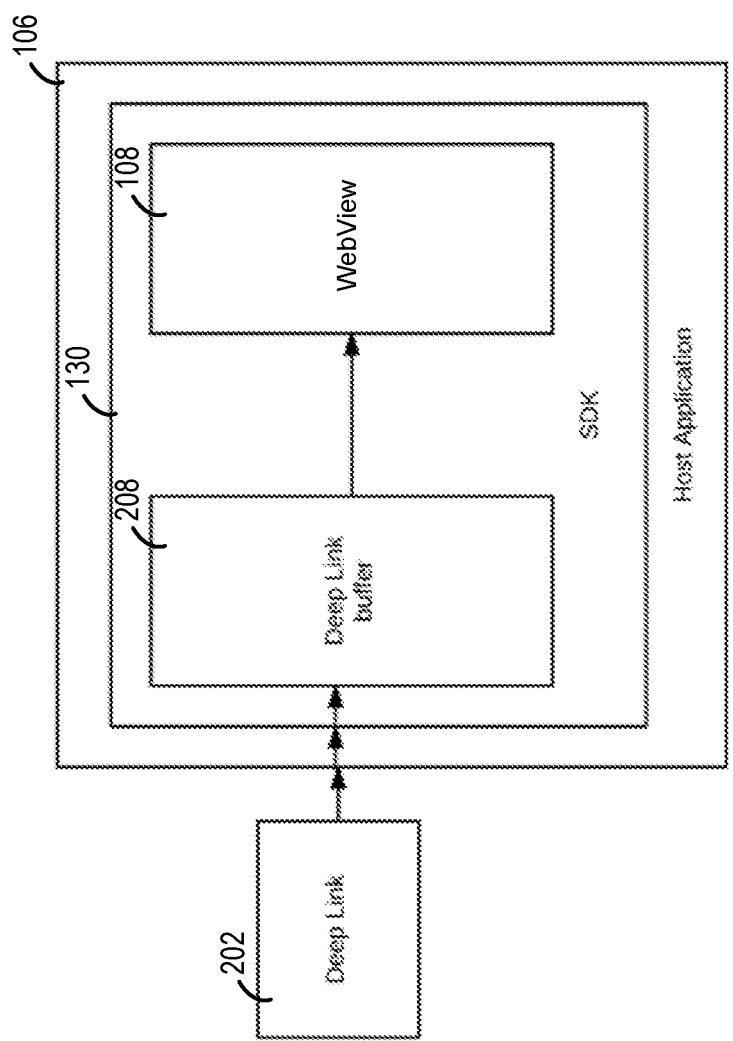
FIG. 11 is a block diagram of the host application buffering a deep link.

FIG. 10 indicates that there are two scenarios when deep link 202 is clicked. First, when host application 106 is not running and user 112 clicks on deep link 202 pointing to a feature in web application 102, host application 106 is launched and receives deep link 202 and forwards it to SDK framework 130. Because webview 108 is not necessarily loaded immediately after host application 106 is launched, however, SDK framework 130 stores deep link 202 in a deep link buffer 208 (FIG. 11) for eventual release once webview 108 is loaded (e.g., by pressing user-operable actuator $124_6$). Second, when user 112 clicks deep link 202 while host application 106 is running, SDK framework 130 may immediately forward it to web application 102, bypassing buffer 208.

By parsing URL content deep link 202, web application 102 is provided with information by which to automatically authenticate with server 24 (i.e., bypassing manual login) and dynamically download corresponding machine-readable instructions (CSS, JavaScript, and HTML) that simulate a UI of host application 106. For example, FIGS. 7 and 8 and the left side of FIG. 2 show a color-and-graphics scheme familiar to fans of the Denver Nuggets. Accordingly, deep link 202 (when tapped), or another authentication process, causes host application 106 (through web application 102) to fetch the corresponding CSS files and user data for displaying a parking pass of user 112 with the same scheme as that of host application 106, thereby simulating the native UI. Moreover, user 112 is presented, by web application 102, a list 210 of pre-purchased passes, each having options 212 (FIG. 2) for using—e.g., transferring to another user, exchanging, canceling, having a QR code manually scanned from a display of smartphone 18 at non-gate events, and otherwise deploying at a gate—a purchased parking pass at an event shown in list 210.

Figure 12:
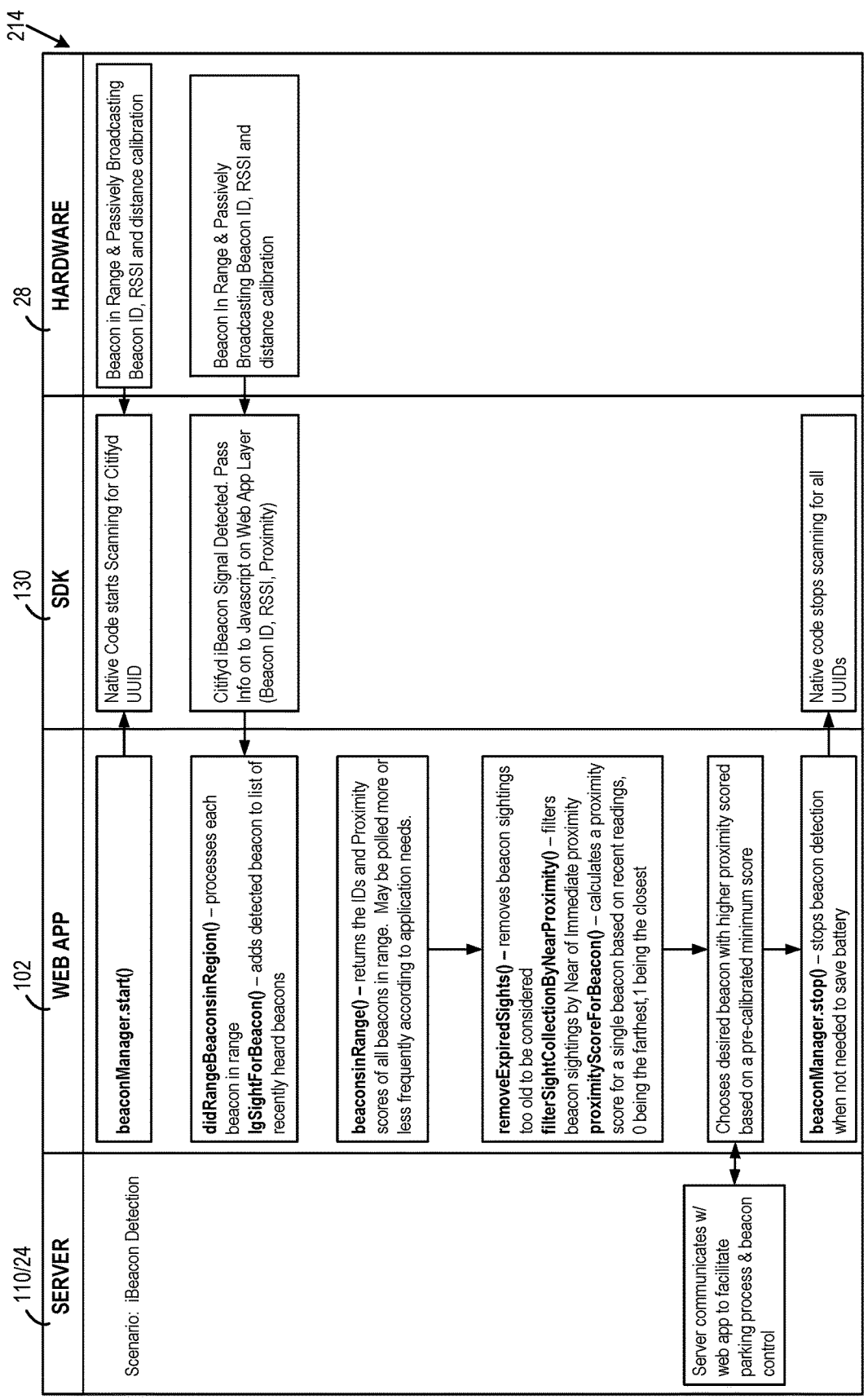
FIGS. 12 and 13A and 13B are flow diagrams showing processes for, respectively, detecting a beacon and opening a gate following authentication and download of the web application.

For gate events, FIG. 12 describes a process 214 to detect a beacon in the vicinity of user 112 carrying smartphone 18 that is (as described previously) reporting its GPS location and receiving BLE signals from nearby beacons. Once a reported GPS location is determined by server 110 to be relatively close to a beacon, it causes web application 102 to run JavaScript functions of process 214 to start scanning for beacons. GPS data is generated during typical GPS use and made available for geofencing and triangulating. For example, if beacon signals are weak, then GPS data may be used instead to locate the beacon and the parker is as well.

System 100 includes a source beacon 28 and a user beacon, the latter of which is implemented in smartphone 18. In one embodiment, source beacon 28 uses BLE Generic Attribute (BLE GATT) Profile advertisement data to announce its presence to user 112. Smartphone 18 equipped with BLE capability then discovers source beacon 28 by monitoring for a specific Universally Unique Identifier (UUID) in the BLE advertisement data. Each beacon 28 transmits its identifier (e.g., a name in the form CTFxx[ID], received signal strength indication (RSSI), and other presence information. SDK framework 130 scans and obtains this information, passing it to web application 102 for processing. Web application 102 then executes JavaScript functions to determine which beacons are in range and remove ones that are no longer in range from a list of nearby detected beacons. A proximity score is calculated for beacons, and a highest proximity beacon that meets a threshold is selected and reported to server 110, which updates web application 102 to begin a gate opening process 216 (FIG. 13).

Figure 13A:
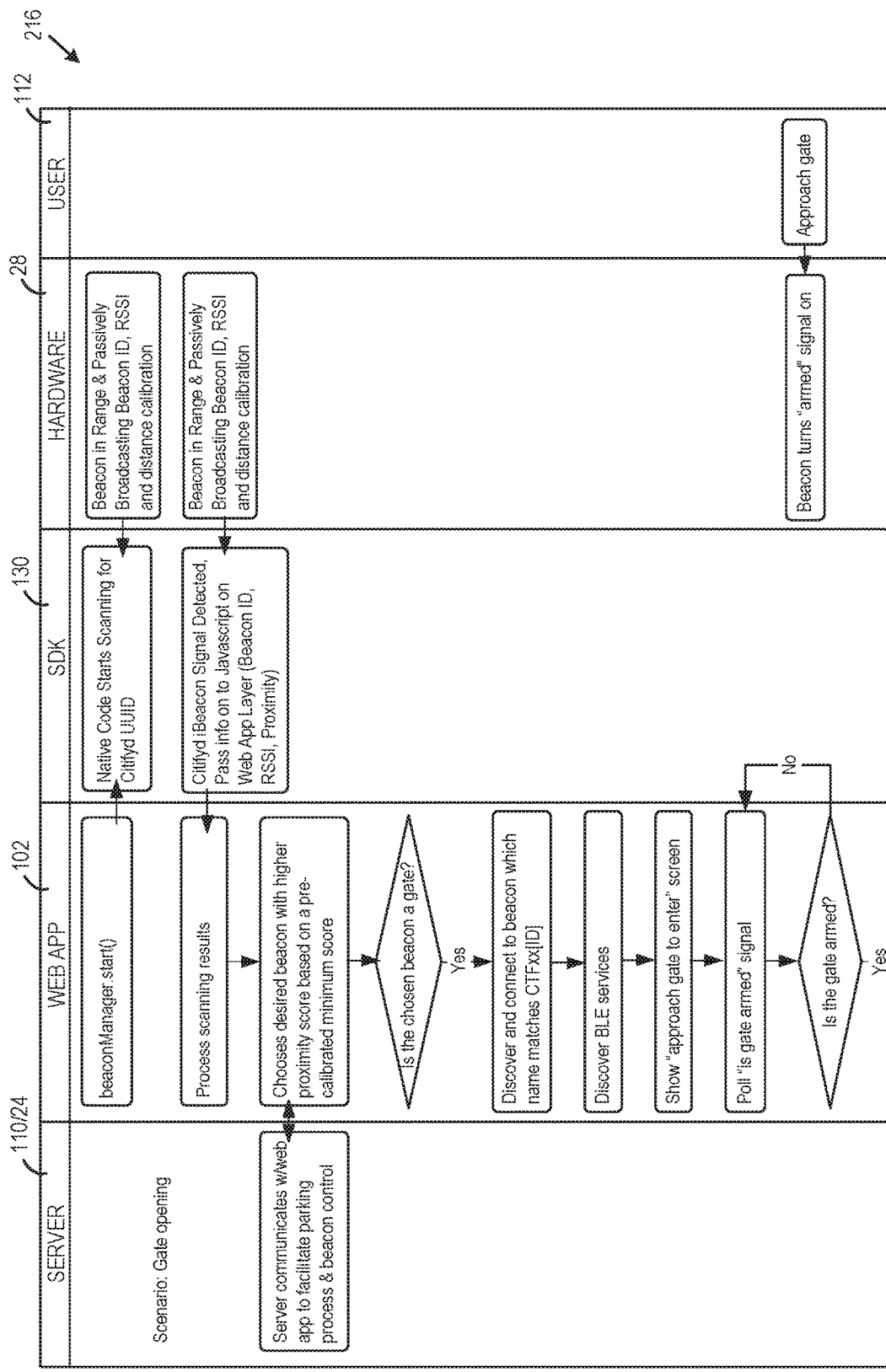
Figure 13B:
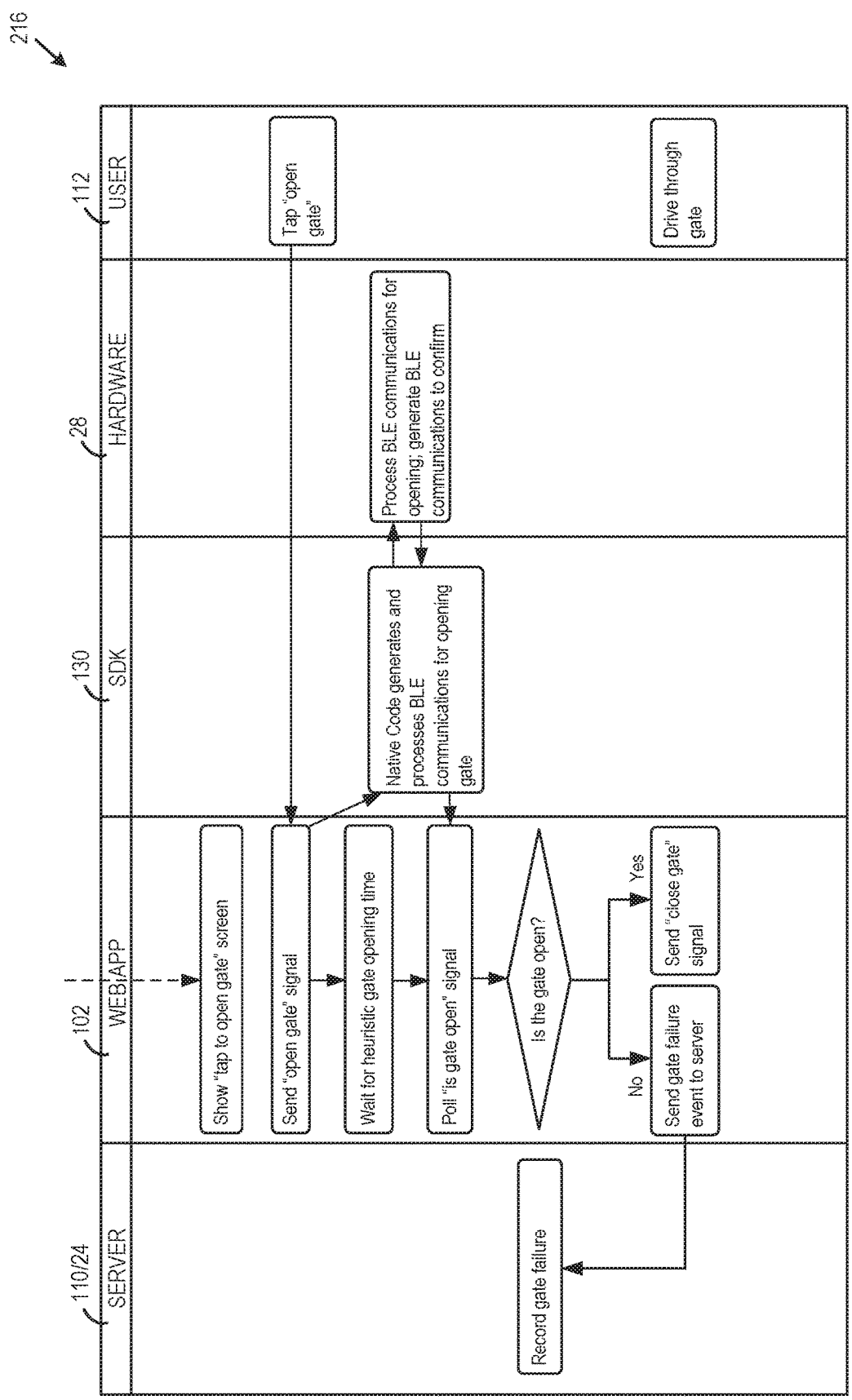

FIG. 13 shows how user 112 carrying smartphone 18 uses web application 102 to actuate beacon 28 for opening a gate in exchange for purchasing a parking pass. Once smartphone 18 identifies source beacon 28 and is within a predetermined range (e.g., distance of 1.5 m), the smartphone beacon starts an authentication process. Source beacon 28 reads the smartphone beacon advertisement, validates it, and signals approval. Then, web application 102, communicating through smartphone 18, interacts with source beacon 28 to control the opening and closing of a parking area entrance and exit barrier gate and to detect the presence of vehicles entering and exiting a parking surface lot or garage facility.

Host application 106 operating on smartphone 18 causes it to initiate the start and the end of a parking transaction session to help reduce false positives. False positives could be caused by customers entering and exiting a parking facility without their vehicles. This is accomplished through explicit action taken on a push notification asking user 112 for further permission to act or within host application 106 itself. System 100 enables a customer to bypass infrastructures of commercial parking lots or facilities when using them.

Figure 14:
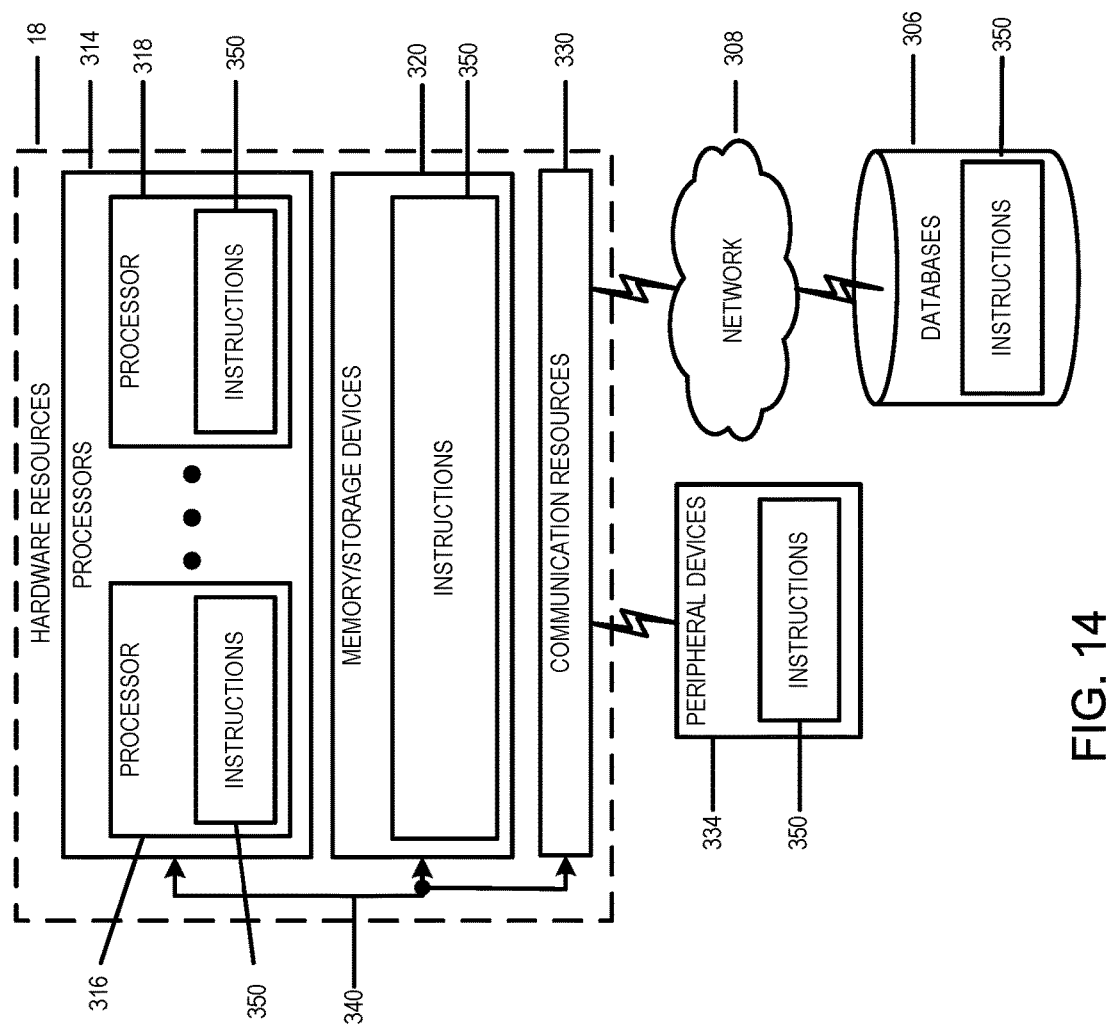
FIG. 14 is a block diagram of a mobile user equipment device embodied as a smartphone having components able to read instructions from a computer-readable medium.

FIG. 14 is a block diagram illustrating components, according to some example embodiments, able to read instructions from a machine-readable or computer-readable medium (e.g., a non-transitory machine-readable storage medium) and perform any one or more of the methods discussed herein. Specifically, FIG. 14 shows a diagrammatic representation of smartphone 18 including one or more processors (or processor cores) 314, one or more memory/storage devices 320, and one or more communication resources 330, each of which may be communicatively coupled via a bus 340.

Processors 314 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 316 and a processor 318.

The memory/storage devices 320 may include main memory, disk storage, or any suitable combination thereof. The memory/storage devices 320 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

Communication resources 330 may include interconnection or network interface components or other suitable devices to communicate with one or more peripheral devices 334 or one or more databases 306 via a network 308. For example, communication resources 330 may include wired communication components (e.g., for coupling via a Universal Serial Bus (USB)), cellular communication components, NFC components, Bluetooth components (e.g., BLE), Wi-Fi components, and other communication components.

Instructions 350 may comprise software, a program, an application, an applet, an app, or other executable code for causing at least any of processors 314 to perform any one or more of the methods discussed herein. The instructions 350 may reside, completely or partially, within at least one of processors 314 (e.g., within the processor's cache memory), memory/storage devices 320, or any suitable combination thereof. Furthermore, any portion of instructions 350 may be transferred to smartphone 18 from any combination of peripheral devices 334 or databases 306. Accordingly, memory of processors 314, memory/storage devices 320, peripheral devices 334, and databases 306 are examples of computer-readable and machine-readable media.

Skilled persons will appreciate that many changes may be made to the details of the above-described embodiments without departing from the underlying principles of the invention. For example, skilled persons will appreciate that JavaScript functions shown in FIGS. 12 and 13 may be performed server- or device-side, and results thereof readily exchanged wirelessly between server 110 and smartphone 18. The scope of the present invention should, therefore, be determined only by the following claims.

The invention claimed is:

1. A method, performed by a smartphone having a processor, memory device, and multiple wireless communication signal interfaces, of communicating parking access information between a host application associated with an operator of a parking area and a web application associated with a parking fee management provider for facilitating access, by a user carrying the smartphone, to the parking area secured by an external smart object controllable through operation of the web application and actuatable through wireless personal area network (WPAN) communications exchanged between the smartphone and the external smart object in response to the operation of the web application, the method comprising:

downloading to the memory device of the smartphone a hybrid mobile application, the hybrid mobile application including native and web application machine-readable instructions, the native application machine-readable instructions, when executed by the processor, causing it to employ the multiple wireless communication signal interfaces of the smartphone and provide native functionality of the host application, the web application machine-readable instructions, when executed by the processor, causing it to present the web application in a webview browser and simulate the native functionality of the host application;

in response to the processor executing the native application machine-readable instructions, obtaining through the multiple wireless communication signal interfaces of the smartphone the parking access information including a location of the smartphone and presence information of the external smart object;

in response to the processor executing the web application machine-readable instructions, providing by wireless communications between the smartphone and a server hosting the web application the parking access information to the web application; and in response to the providing, generating the WPAN communications to actuate the external smart object based on controls made available through the operation of the web application.

2. The method of claim 1, further comprising presenting to the user of the smartphone a common user interface (UI) scheme of the hybrid mobile application so as to simulate in the webview browser the native functionality of the host application.

3. The method of claim 2, in which the common UI scheme is defined by native UI elements of the host application and one or more cascading style sheets (CSS) of the web application.

4. The method of claim 1, further comprising obtaining the location from a GPS.

5. The method of claim 1, further comprising obtaining the presence information from BLE signals transmitted from the external smart object.

6. The method of claim 1, in which the web application machine-readable instructions include JavaScript downloaded from the server of the web application.

7. The method of claim 1, further comprising receiving a message including a link for causing the smartphone to download the web application machine-readable instructions.

8. The method of claim 1, in which the presence information includes a beacon identifier (ID) or received signal strength indication (RSSI).

9. A system for communicating parking access information between a host application associated with an operator of a parking area and a web application associated with a parking fee management provider, the system comprising:

an external smart object to secure the parking area, the external smart object controllable through operation of the web application and actuatable through wireless personal area network (WPAN) communications;

a mobile device having a hybrid mobile application, the hybrid mobile application including the host application and the web application functionally interacting with each other by operation of a webview browser, the hybrid mobile application including computer code operating in the webview browser to provide a native bridge for exchanging the WPAN communications with the external smart object and obtaining parking access information from the mobile device; and a server to host the web application and facilitate access, by a user carrying the mobile device, to the parking area based on the parking access information provided through the web application.

10. The system of claim 9, in which the external smart object is a beacon.

11. The system of claim 9, in which the web application includes a user interface simulating that of the host application.

12. The system of claim 11, in which the user interface is rendered using non-native HTML and CSS.

13. The system of claim 12, in which the non-native HTML and CSS are provided by the server in response to the user logging into the web application.

14. The system of claim 12, in which the non-native HTML and CSS are provided by the server in response to the user tapping a deep link.

* * * * *